United States Patent [19]

Knowlton

[11] Patent Number: 5,548,664
[45] Date of Patent: Aug. 20, 1996

[54] AUTOMATIC DETERMINATION OF BLANK PAGES AND BINARY IMAGES' BOUNDING BOXES

[75] Inventor: Kenneth C. Knowlton, Merrimack, N.H.

[73] Assignee: Wang Laboratories, Inc., Billerica, Mass.

[21] Appl. No.: 268,219

[22] Filed: Jun. 29, 1994

[51] Int. Cl.$^6$ .................................................. G06K 9/34
[52] U.S. Cl. ........................................... 382/174; 358/464
[58] Field of Search ............................. 382/176, 174, 382/180, 177, 178, 173, 194; 358/464, 462

[56] References Cited

U.S. PATENT DOCUMENTS

| | | | |
|---|---|---|---|
| 4,503,556 | 3/1985 | Scherl et al. | 382/176 |
| 5,091,964 | 2/1992 | Shimomura | 382/176 |
| 5,138,674 | 8/1992 | Sugawa | 358/464 |
| 5,161,213 | 11/1992 | Knowlton | 395/128 |
| 5,430,808 | 7/1995 | Baird et al. | 382/176 |

OTHER PUBLICATIONS

Advertisement–1993 Visioneer 2860 West Bayshore, Palo Alto, CA 94303 Visioneer, PaperMax, and MaxMate, 2 pages.

*Primary Examiner*—Michael T. Razavi
*Assistant Examiner*—Jon Chang
*Attorney, Agent, or Firm*—Ronald J. Paglierani

[57] ABSTRACT

A method, and apparatus for executing the method, for processing digitized image data representative of a page. The method includes the steps of (a) processing the image data on a scanline by scanline basis to partition the image data into a plurality of rows and columns of N×M arrays (14a) of image pixels. The step of partitioning includes the steps of, for each row of an N×M array of image pixels, (b) detecting occurrences, if any, along any scanline of an image pixel having a foreground value; for a non-zero number of detected occurrences within one N×M array of image pixels, (c) incrementing a corresponding array row count and a corresponding array column count; and (d) for at least one detected occurrence, adjusting the boundary of a bounding box so as to enclose the at least one detected occurrence and substantially all previously detected occurrences. The method includes the terminal steps of examining the boundary of the bounding box and, if the boundary is set at an initial unrealizable condition, declaring the page to be blank, else if the boundary is not set at the initial condition, declaring that the binary image of the page includes information within the boundary of the bounding box. Methods for deriving an iconic image of the digitized image data are also described.

17 Claims, 5 Drawing Sheets

AUTOMATIC DETERMINATION OF BLANK PAGES AND BINARY IMAGES' BOUNDING BOXES

FIELD OF THE INVENTION

This invention relates generally to document processing systems and, in particular, to a document processing system that includes an optical scanner for inputting data representative of information appearing on a page of a document.

BACKGROUND OF THE INVENTION

One well known technique to enter one or more pages of a document into a document processing system employs an optical scanner to sense differences in optical contrast that occur on a surface of a page. The differences in optical contrast are converted to binary information (pixels) at a predetermined or selected resolution, such as 200 dots per inch (dpi), and are output in a scan line format. The output data may be subsequently processed to identify an informational content of the scanned image. Optical character recognition (OCR) is one well known processing technique that is used to convert the image pixels to recognized alphanumeric characters.

One problem that arises in systems that digitize document and other types of pages is in identifying blank pages and partially blank pages. For example, if a number of pages of a double sided document are automatically fed through a document scanner some of these pages may be blank (text only on one side), or partially blank. In that the page image data is typically compressed or otherwise processed prior to storage, it can be appreciated that inefficiencies occur when a totally or partially blank page is input to a data compression algorithm. That is, it would be desirable to rapidly identify a page as being blank so that the page image can be discarded without being further processed. In like manner, if a page is only partly covered by text or graphics, it would be desirable to input to a subsequent process, or to display, only that portion of the page image that contains information, and to ignore the remainder of the page image.

SUMMARY OF THE INVENTION

It is thus an object of this invention to rapidly determine that a binary image of a page has no informational content, so as to avoid expending any system resources to further handle or process the binary image.

It is another object of this invention to rapidly determine what portion of a binary image of a page has no informational content, so as to avoid expending any system resources to further handle or process the identified portion and to minimize the display of blank areas.

It is a further object of this invention to enable a merging of an operation that determines which area, if any, of an input image has an informational content with a generation of a reduced iconic image or stamp of the input image.

The foregoing and other problems are overcome and the objects of the invention are realized by a method, and apparatus for executing the method, for processing digitized image data representative of a page. The method includes the steps of (a) processing the image data on a scanline by scanline basis to partition the image data into a plurality of rows and columns of N×M arrays or subarrays of image pixels. The step of partitioning includes the steps of, for each row of an N×M array of image pixels, (b) detecting occurrences, if any, along any scanline of an image pixel having a foreground value; for a non-zero number of detected occurrences within one N×M array of image pixels, (c) incrementing a corresponding array row count and a corresponding array column count; and (d) for at least one detected occurrence, adjusting the boundary of a bounding box in accordance with the array row and column counts so as to enclose the at least one detected occurrence and substantially all previously detected occurrences.

The method includes the terminal steps of examining the boundary of the bounding box and, if the boundary is set at an initial unrealizable condition, declaring the page to be blank, else if the boundary is not set at the initial condition, declaring that the binary image of the page includes information within the boundary of the bounding box.

Methods are also described for deriving an iconic image of the digitized image data, the methods being based on the pixel-content of the N×M arrays.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
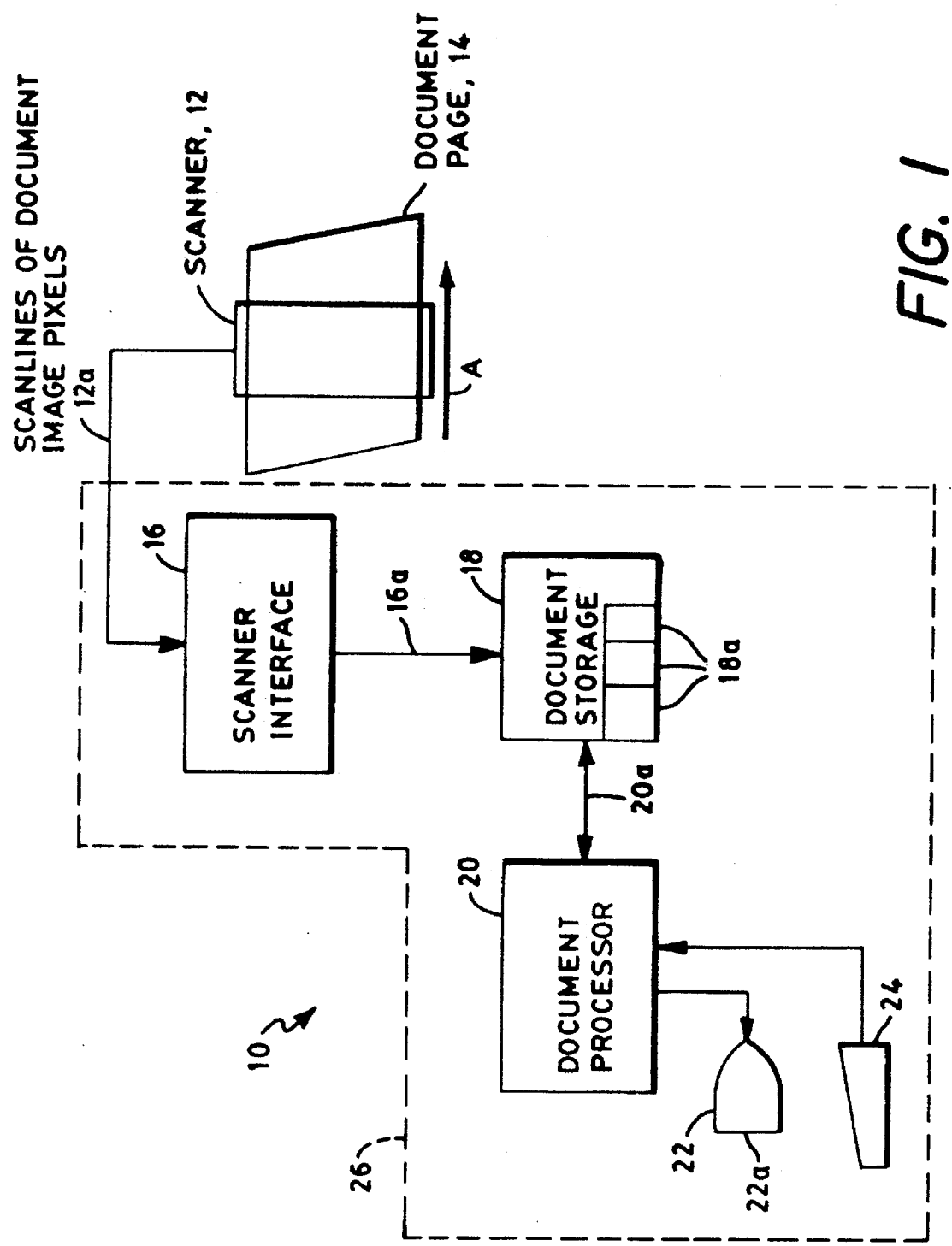
FIG. 1 is a simplified block diagram of a document processing system that is constructed and operated in accordance with this invention.

FIG. 1 illustrates a document processing system 10 that is constructed and operated in accordance with this invention. A conventional document scanner 12 is employed to detect an optical contrast resulting from printed text and graphical images that appear on a surface of a scanned document page 14. As employed herein a "page" is intended to encompass any substrate capable of having indicia, such as symbols, text, and graphics, that are written, deposited, or imprinted thereon. Relative motion between the scanner 12 and the page 14 causes the scanner 12 to output on signal line(s) 12a a sequence of binary ones and zeros that are indicative of the optical contrast that is sensed by the scanner. By example, a binary one indicates the presence of a dark area on the page 14 (a portion of a character or a graphical image), while a binary zero indicates an absence of a dark area (the background or "whitespace"). As employed herein the binary ones and zeros are each referred to as a pixel. The binary information is output in a scanline format, wherein a scanline is oriented perpendicularly to the scan direction (indicated by the arrow A). As such, a single scanline will typically include pixels from only portions characters. As an example, and assuming the resolution of the scanner 12 is 200 dpi and that the page 14 is 8.5 inches wide, a scanline can comprise up to 1700 discrete pixels (8.5×200). Typical scanner resolutions are in the range of 100 dots (or pixels) per inch (along the scanline) to 400 dpi.

Coupled to the signal line(s) 12a, and hence to the output of the scanner 12, is a scanner interface 16. In this embodiment of the invention the scanner interface 16 is constructed and operated so as to execute the method of this invention, as will be described in detail below.

An output of the scanner interface 16 is coupled via a bus 16a to a document storage module 18. Storage module 18 may be embodied within semiconductor memory, magnetic or optical disk memory, magnetic or optical tape, or any form suitable for storing the digitized document page data. As shown, the storage module 18 has three stored document pages represented as page data blocks 18a. Each of the blocks 18a is preferably compressed, using known data compression techniques, prior to storage. As such, and as is indicated in FIG. 1, each block may occupy a different amount of storage space within the storage module 18.

Accessing of the document storage 18 and display of the pages is controlled by a document processor 20. This processor is bidirectionally coupled to the document storage module 18 via bus 20a, and is also coupled to conventional user interface devices such as a CRT display 22, having a display screen 22a, and keyboard 24. In that the scanned document pages may include graphical information in addition to text, the display 22 preferably also includes graphical capabilities. The document processor 20 may have word processing and editing capabilities, although for a document archiving application these capabilities may not be required or desirable.

It should be realized that the components 16–24 may all be incorporated within a single data processor 26, such as a personal computer. In this case, the scanner interface 16 may be a software module that is invoked to process the output of the scanner 12, which may be coupled to a parallel or a serial port of the data processor 26 in a conventional manner. Also in this case, the buses 16a and 20a may be the same system bus, whereby the scanner interface software and the document processor software are interfaced to the main memory and mass storage components of the data processor 26. In a further embodiment of this invention the scanner 12 can be made an integral component of the data processor 26.

As such, it should be understood that the embodiment of the document processing system 10 of FIG. 1 is intended to be viewed as an exemplary embodiment of this invention, and is in no way intended to be viewed as a limitation upon the practice of this invention.

Figure 2:
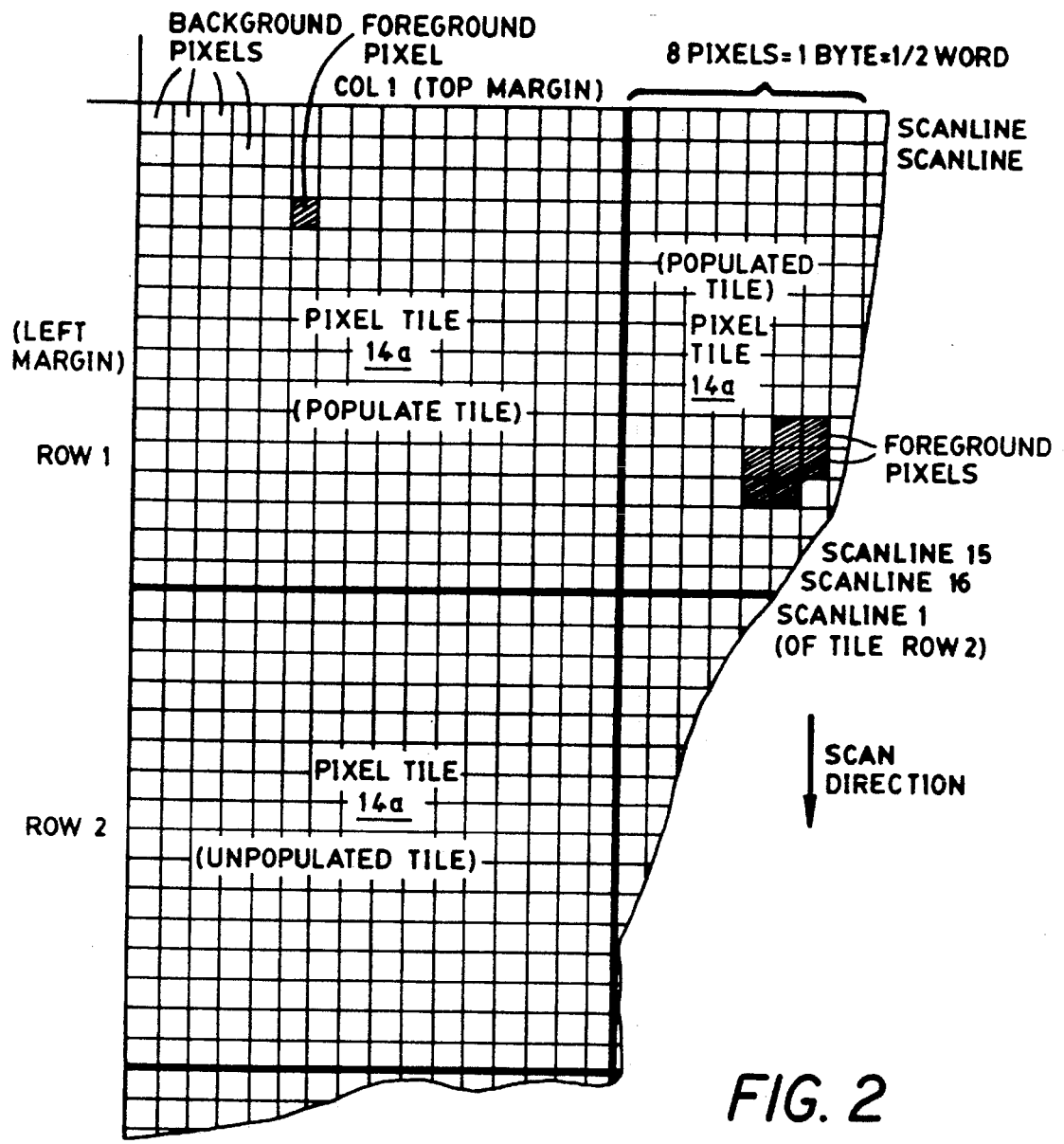
FIG. 2 illustrates exemplary arrays of 16×16 pixel tiles.

In accordance with this invention, and referring to FIG. 2, the binary image data that represents the page 14 is received from the scanner 12 and is logically divided by the scanner interface 16 during the execution of the method of this invention into a plurality of tiles 14a, each tile being comprised of an N×M array of pixels. In a presently preferred embodiment of this invention N and M are both equal to 16, although this value does not represent a limitation upon the practice of this invention. A top margin, left margin, and right margin (not shown) of predetermined size is established so as to eliminate any noise that may generated due to the edges of the document page 14 as it is scanned. Each pixel tile 14a will include from zero to 16×16=256 pixels having the foreground value (e.g., binary 1).

Figure 3:
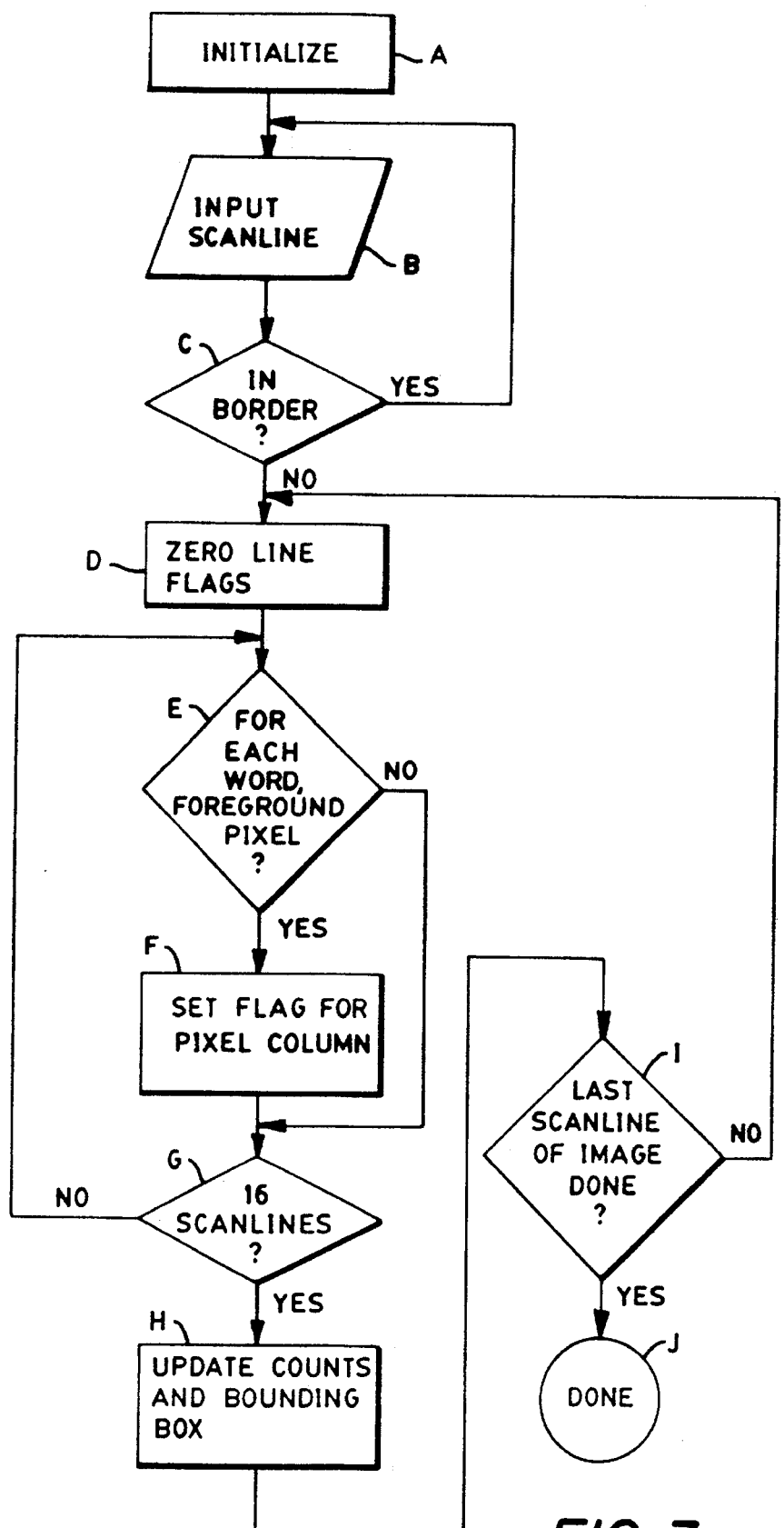
FIG. 3 is logic flow diagram of a presently preferred method of this invention.

Referring to FIG. 3, for each of the pixel tiles 14a a determination is made as to whether the pixel tile includes at least one foreground pixel. Various statistics are retained during a single pass over the digital page image, the statistics indicating, for each row and each column of the pixel tiles, a number of pixel tiles 14a that are populated with at least one foreground pixel. The resulting vectors enable a rapid determination of which pages are blank, that is which pages are devoid of informational content and, for non-blank pages, an extent of a bounding box that encloses substantially all of the image containing an informational content.

The accurate and rapid determination of blank pages is important to achieve processing speed and storage efficiencies, in that blank pages need no further processing, such as compression, and are not required to be stored. However, blank pages may be compressed along with non-blank pages, in that the compressed blank image will typically be of a small size. For a non-blank image, the determination of the coordinates of the bounding box about the informational content of the page can speed the compression operation, and can also aid in fitting the meaningful part of the image to a window on the screen of the display 22.

Figure 4C:
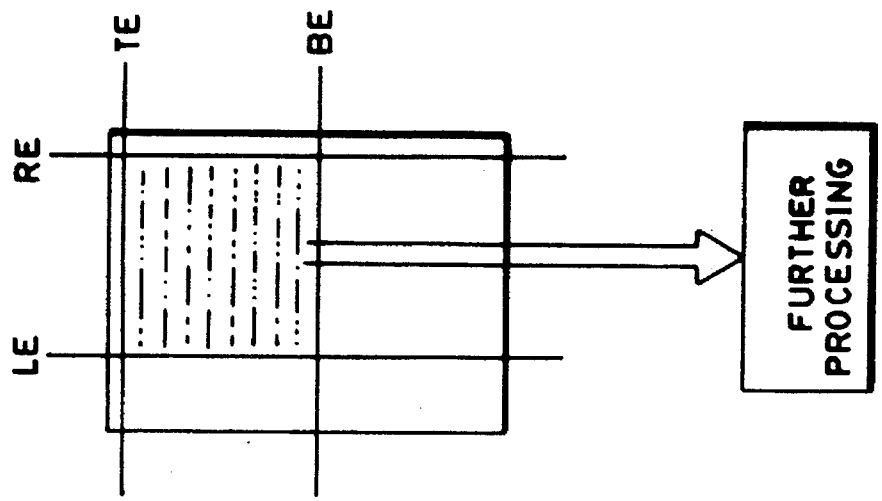
FIGS. 4a–4c illustrate exemplary bounding boxes that are obtained at the termination of the method of this invention.

More particularly, during the execution of the method the binary image of the page 14 is divided, on a scanline by scanline basis, into rows and columns of 16×16 pixel tiles, and it is determined for each tile whether the tile is populated with at least one foreground pixel. After a complete row of tiles is processed, what is retained is the number of populated tiles in that row and for each column of tiles, that is, an updated number of populated tiles. The edges of the bounding box are determined from these vectors, to 16-pixel granularity, as are the 0.1 and 99.9 percentile points in both directions (vertically and horizontally). That is, a determination is made of the boundary of an image area that contains approximately 100% of the foreground pixels, it being assumed that the location of the foreground pixels corresponds to the location of the informational content (text, graphics, or text and graphics) that is recorded on the surface of the page. The bounding box is maintained current for the partial image up to and including the last complete group of 16 scanlines (the last tier of tiles). As is indicated in FIG. 4a and described below, the bounds of the bounding box are meaningless before the first foreground pixel has been detected.

Because of possible edge artifacts, the borders or margins along the top, left, and right edges of the image are considered vacant. In a presently preferred embodiment of the invention the margins each have a width of approximately 0.16 inches. The measurement of the margin width (in pixels) is obtained from a user-supplied parameter that specifies the resolution (dots per inch) of the scanner 12.

The following pseudocode illustrates the presently preferred embodiment of the method of this invention. The pseudocode listing is intended to be read in conjunction with the logic flow diagram of FIG. 3. The text following a | is a continuation of text from a preceding line.

Initialization (Block A)

This step operates to:

```
check parameters for validity;
record image specifications;
calculate (in pixel units) and record marginal area to
                                              | ignore; and
zero arrays and other values.
```

Scanline Processing (Blocks B–J)

Each scanline that is generated by the scanner 16 is processed as follows:

```
if still in top margin border to skip, return (Blocks
                                       | B and C);
if starting set of 16 lines, zero occupancy flags
                                       | across scanline;
for each word, where a word is comprised of two
                    | contiguous bytes of pixels (Block D)
    if word has a foreground pixel (Block E);
        set the flag for this column of pixel tiles
                                       | (Block F);
increment scanlines of pixels accumulated, and
if accumulated lines of pixels not equal to 16, return
                                       | (Block G);
reset to zero the number of scanlines of pixels
                                       | accumulated
                                       | (Block H);
zero count of populated pixel tiles for this row of
                                       | pixel tiles;
for each flag, if flag is set
    increment count of populated pixel tiles for
                                       | this column of pixel tiles;
    increment count of populated pixel tiles for
                                       | this row of pixel tiles;
store count of populated pixel tiles for this row of
                                       | pixel tiles;
if count is zero, return;
find 0.1 and 99.9 percentile points in row and column
                                       | arrays of pixel tiles;
continue to process scanlines until done (Blocks I,J).
```

The following C-language routine can be employed to find the 0.1 and 99.9 percentile boundaries that contain substantially all of the pixels. In this routine "wordswide" is the scanwidth in words.

```
/* find 0.1 and 99.9 percentile boundaries, convert them
to pixels */
marginmax = boxptr—>total / 1000;
lefsum = 0; lefcol     =         -1;
ritsum = 0; ritcol     =         wordswide;
topsum = 0; toprow     =         -1;
botsum = 0; botrow     =         haverows;
while(lefsum    <= marginmax)lefsum   += col[++lefcol];
while(ritsum    <= marginmax)ritsum   += col[—ritcol];
while(topsum    <= marginmax)topsum   += row[++toprow];
while(botsum    <= marginmax)botsum   += row[—botrow];
boxptr—>lef    =    lefcol*16;
boxptr—>rit    =    ritcol*16 + 15;
boxptr—>top    =    toprow*16;
boxptr—>bot    =    botrow*16 + 15;
return;
```

Referring to FIG. 4a, the bounding box is initially set so that the left edge (LE) is positioned off the right of the image page, the right edge (RE) is positioned off the left of the image page, the top edge (TE) is positioned off the bottom of the image page, and the bottom edge (BE) is positioned off the top of the image page. At the termination of the method if the bounding box still has this "inverted" configuration, it can be assumed that the page image contained no foreground pixels and is therefore blank. That is, the detection of a foreground pixel did not occur during the execution of the method and the edges of the bounding box were not updated accordingly. This page image is assumed to be devoid of informational content, and no further processing or storage is required.

Figure 4B:
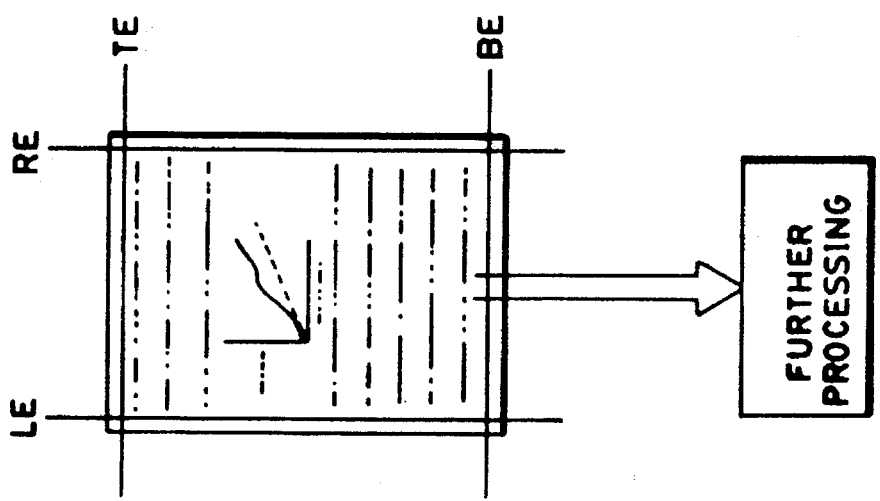
Figure 4A:
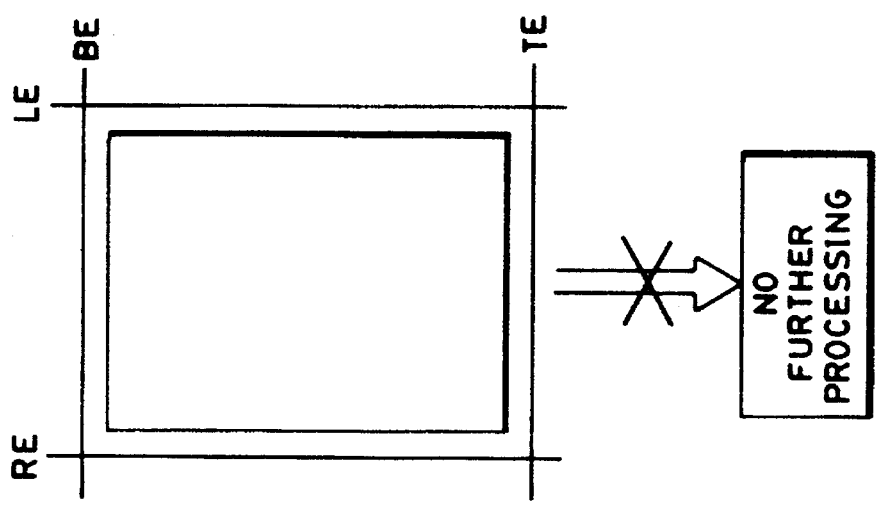

FIG. 4b illustrates an exemplary final bounding box for a page image that contains a significant amount of text and graphics. As can be seen, the updating of the bounding box during the execution of the method has resulted in the four edges being repositioned so as to enclose most of the page image.

FIG. 4c illustrates an exemplary final bounding box for a page image that contains text in only one portion, while the remainder is blank. For this case the resulting bounding box clearly indicates that only approximately 40% of the page need be compressed and stored, thereby improving the efficiency of these further processing steps.

Having thus described a first aspect of this invention, an extension of the teaching of this invention is now described.

The perusal of an image to determine the bounds of useful information (or blank page) is similar in some respects to producing for that page an iconic image (commonly called a "stamp" or "thumbnail"), particularly when a 200 dpi image is to be reduced by a linear factor of 16. In this case the area previously considered as a "tile" or N×M pixel array for the bounding-box determination is equivalent to the area that is "compressed" to a single pixel for generating the iconic image.

Both computations are input intensive in exactly the same way. A large savings in I/O and computation time can therefore result from merging the two processes, if and when the user desires the generation of such stamps. There are several cases to consider, herein enumerated and described below as modifications and/or augmentations of the foregoing disclosure that was referenced to FIGS. 1–4c.

Figure 5:
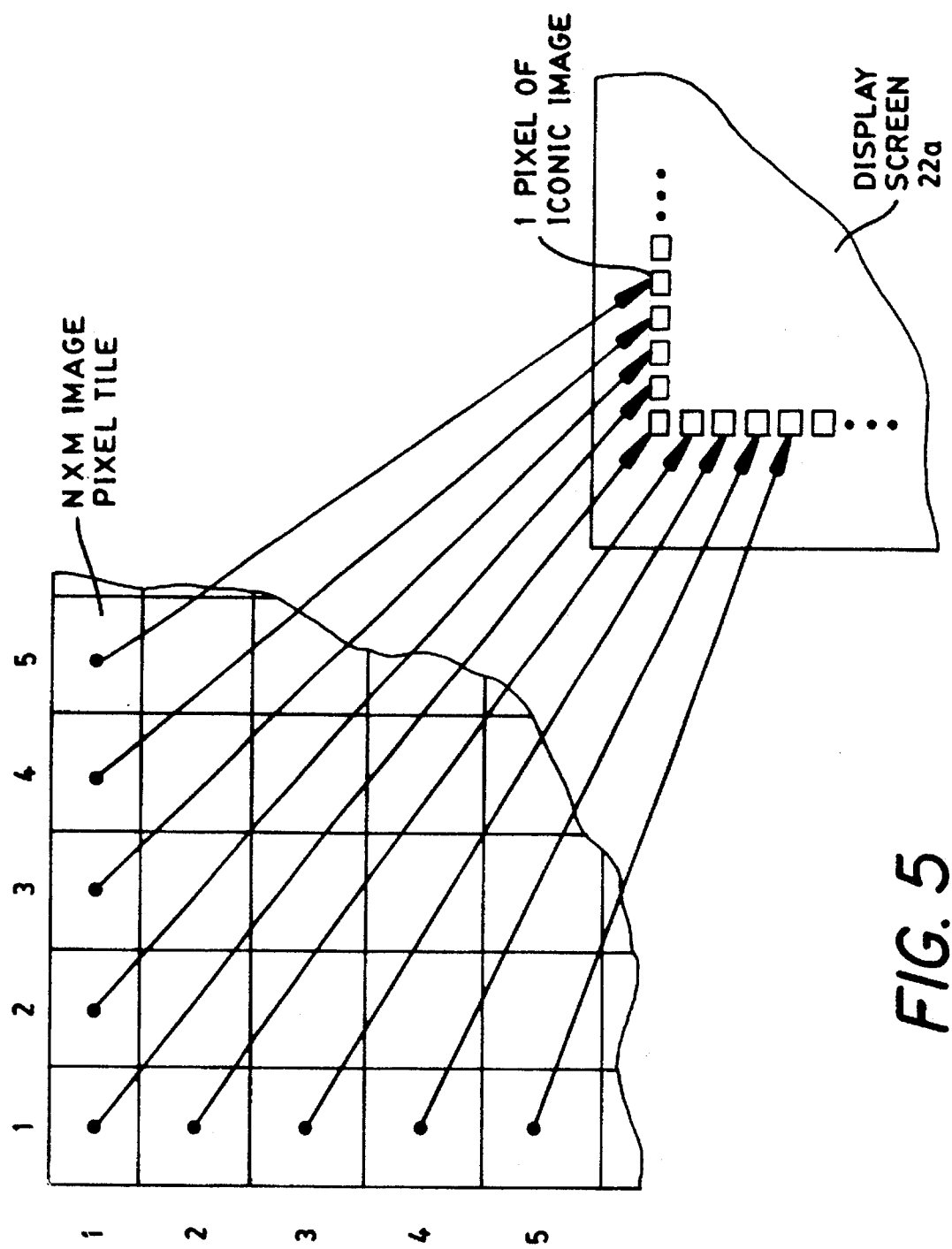
FIG. 5 depicts the relationship of individual pixels of an iconic image of a document page to individual ones of N×M arrays of document image pixels in accordance with an aspect of this invention.

Reference is now made to FIG. 5, where individual ones of the N×M pixel tiles of the original document image are equivalent or reduced to, by example, one pixel of the iconic (simplified) displayable image of the document page. As will be described below, whether a given one of the pixels of the iconic image is on or off is a function of the pixel content of the corresponding one of the N×M pixel tiles. It should be realized that a pixel being "on or off" may be an over-simplification, in that in some embodiments of this invention the gray scale value or the color value of each pixel of the iconic image may be a function of the pixel content of the N×M pixel tiles. In general, a visual characteristic of each pixel of the iconic image is a function of the pixel content of the corresponding one, or ones, of the N×M pixel tiles.

If the generation of an iconic image is not desired then the stamp-making is not merged into the determination of the bounding box or blank page. For this condition the image need not be divided into tiles, and instead the top and bottom bounds can as readily be determined to pixel accuracy, whereas left and right bounds can be determined to word-size or byte-size granularity (i.e. the "tiles" become word or byte-wide and pixel-high).

It should be noted that, in all instances, the amount of computation required, if any, for subsequent processing of the stamp image is significantly less than that involved in scanning the full input image. This is a result of the fact that the stamp image typically contains less than half of one percent of the input image's area.

Case 1: Each 1-bit of the stamp represents the presence of at least one foreground pixel, or no such pixels, in the N×M subpart of the input image. The contents of the inner loop:

```
if(*(getptr+i))flags[i]=1;
``` remains the same but at the completion of, for example, 16 lines the flag bits are packed into a line of pixels of the icon. The flags, as before, are also used to determine the bounding area of the meaningful image.

At the end of processing the entire image, the iconic image may be clipped on any or all sides (not necessarily as much proportionally as the actual image is) and enlarged.

Case 2. Each 1-bit of the iconic image represents the number of pixels in the N×M array being more than some threshold. The inner loop above, formerly coded so as to note the presence of foreground pixels per N×M subarea, is rewritten so as to COUNT the foreground pixels in each such subarea. The inner loop is thus constructed so as add to the count, such as by a table lookup, the number of 1-bits in each non-zero word:

if ((word=*(getptr+i))!=0) count[i]+=(bitof[word>>8 ]+bitsof[word & 0xFF]).

Alternatively, the image can be picked up byte by byte:

count[i]+=bitsof[*getbytptr++].

For the stamp, and after summing bits in each set of, by example, 16 lines, the total for each 16×16 (or N×M) area is compared with a threshold to determine whether to use a 1 or 0 as the corresponding pixel.

For the bounding box or blank page determination described above, sums of pixels can be maintained, rather than sums of populated tiles, in each row and column of tiles. The bounding box and blank page determinations are otherwise substantially as described above.

Case 3: For this instance each pixel of the stamp depends on some local relationship of counts of pixels in the N×M image. Counts of pixels per tile are collected as in Case 2. However, at least the last three such rows of tile counts are retained so that a stamp pixel representing a middle row tile can be based on pixel counts of the eight neighboring tiles. By example, in FIG. 5 the pixel corresponding to the row 3, column 3 (3,3) 16×16 pixel tile has a visual characteristic that is a function of at least a portion of the pixel content of the (2,2), (2,3), (2,4), (3,4), (4,4), (4,3), (4,2) and (3,2)tiles.

The stamp-making method in this case may, for example, follow the teachings of set forth in commonly assigned U.S. Pat. No. 5,161,213, issued Nov. 3, 192 to the inventor of the subject matter of this patent application. The disclosure of U.S. Pat. No. 5,161,213 is thus incorporated by reference herein in its entirety.

The bounding box and blank page determination are performed as in Case 2.

Case 4: For this instance no stamp is required. Therefore the tiling, fixed throughout the processing of an image, is not required. Instead, counts are kept of 1-bits per row of pixels and per byte-wide or word-wide column. Processing of the counts of pixels proceeds in the manner of processing of counts of populated tiles as described above with respect to FIGS. 1–4c. The result is pixel size-accurate for upper and lower bounds of the bounding box, and byte-size (or word-size) accurate for the left and right bounds.

Case 5: For this instance no stamp is required, and the bounding box is defined by positions of the uppermost, bottommost, leftmost and rightmost 1-bit, which is determined to pixel-accuracy. It is not necessary in this case to maintain pixel counts (as in case 4), but instead to simply monitor lines from the top and, for each line in which some leftmost pixel has been found, to also scan from the right to locate the rightmost pixel. A test is then performed to determine whether one or both located leftmost and rightmost pixels are at lateral extremes (as determined thus far).

It is noted that lateral pixel accuracy may not be desirable, because this implies that a shifting operation will subsequently be performed on the entire image to realign byte/word boundaries. Such a shifting operation is time consuming as compared to simply removing large background margins. There is little if any processing overhead for maintaining top-to-bottom pixel accuracy and, as a result, pixel accuracy can be maintained for these dimensions.

Case 6: No stamp is required for this last instance. The bounding box is defined by the positions of uppermost, bottommost, rightmost and leftmost, by example, 0.1 percentile and 99.9 percentile rows and columns of pixels. This is an extension of the method of case 5, but more elaborate in that row and column counts are retained in the neighborhood of the extremes detected thus far. This may not be preferred for some implementations, since the improvement in the display of other subsequent processing is slight as compared to the additional computation time.

The methods of this invention may be executed within the scanner interface 16 so as to pre-process in real time the output of the scanner 14, one scanline at a time. The methods of the invention may also be employed to preprocess already stored binary image data prior to compression, optical character recognition and/or display. The methods for forming the iconic image may be performed in the scanner 16 or in the document processor 20.

Although described above in the context of specific dimensions, values for foreground and background pixels, scanline resolutions and the like, it should be realized that a number of changes can be made to these parameters without departing from the scope of the teaching of this invention. Furthermore, it can be realized that the individual blocks of the logic flow diagram of FIG. 3 can be implemented in whole or in part by circuitry, such as programmed processors or dedicated circuits, that operate to execute the described functions.

Thus, while the invention has been particularly shown and described with respect to a preferred embodiment thereof, it will be understood by those skilled in the art that changes in form and details may be made therein without departing from the scope and spirit of the invention.

What is claimed is:

1. A method for processing digitized image data representative of a page, comprising the steps of:

partitioning the digitized image data into rows and columns of N×M arrays of image pixels;, setting a boundary specification of a bounding box to an initial condition so as to enclose the digitized image data;

processing the digitized image data on a scanline by scanline basis;

for each pixel row in an N×M array of image pixels, detecting occurrences, if any, of an image pixel having a foreground value, along each scanline;

for a detected occurrence of an image foreground pixel along a scanline, indicating that the N×M array, within which the foreground pixel is located, is occupied by at least one foreground pixel;

for a foreground-occupied N×M array of image pixels, incrementing a corresponding N×M array row count and a corresponding N×M array column count; and for at least one detected occurrence of an image foreground pixel along a scanline, adjusting the boundary specification of the bounding box in accordance with the N×M array row and column counts so as to enclose within the bounding box the at least one detected occurrence and substantially all previously detected occurrences, and including the terminal steps of;

examining the boundary specification of the bounding box; and, if the boundary specification is set at the initial condition, declaring the page to be blank.

2. A method as set forth in claim 1, wherein if the boundary specification is not set at the initial condition, declaring that the binary image of the page includes information within the boundary of the bounding box.

3. A method as set forth in claim 1 wherein the step of partitioning includes a step of ignoring image pixels that correspond to at least one page border having a predetermined Width.

4. A method as set forth in claim 1 and including the additional step of generating a displayable image of the image data, the displayable image having a plurality of pixels individual ones of which represent a plurality of image pixels of the image data.

5. A method as set forth in claim 1 and including the additional step of generating a displayable image of the image data, the displayable image having a plurality of pixels individual ones of which correspond to one of the N×M arrays.

6. A method as set forth in claim 1 and including the additional step of generating a displayable image of the image data, the displayable image having a plurality of pixels individual ones of which have a visual characteristic that is a function of a number of foreground pixels of at least one of the N×M arrays.

7. A method as set forth in claim 1 and including the additional step of generating a displayable image of the image data, the displayable image having a plurality of pixels individual ones of which have a visual characteristic that is a function of the numbers of foreground pixels of one of the N×M arrays and of a plurality of neighboring ones of the N×M arrays.

8. Apparatus for processing digitized image data representative of a page, comprising:

means for processing the digitized image data on a scanline by scanline basis, said processing means comprising means for partitioning the digitized image data into rows and columns of N×M arrays of image pixels and means for setting a boundary specification of a bounding box to an initial condition so as to enclose the digitized image data;

means for detecting occurrences, if any, of an image pixel having a foreground value, along each scanline;

means, responsive to a detected occurrence of an image foreground pixel along a scanline, for indicating that the N×M array, within which the foreground pixel is located, is occupied by at least one foreground pixel and for incrementing a corresponding N×M array row count and a corresponding N×M array column count; and means, responsive to a detected occurrence of an image foreground pixel along a scanline, for adjusting the boundary specification of the bounding box in accordance with the N×M array row and column counts so as to enclose within the bounding box the at least one detected occurrence and substantially all previously detected occurrences, and further including means, that is responsive to a last scanline being processed, for examining the boundary of the bounding box; and, if the boundary is set at the initial condition, for declaring the page to be blank.

9. Apparatus as set forth in claim 8, wherein said boundary examining means is responsive to a condition wherein the boundary is not set at the initial condition, for declaring that the binary image of the page includes information within the boundary of the bounding box.

10. Apparatus as set forth in claim 8 wherein said partitioning means operates to ignore image pixels that correspond to at least one page border having a predetermined width.

11. Apparatus as set forth in claim 8 and further comprising means for generating a displayable image of the image data, the displayable image having a plurality of pixels individual ones of which represent a plurality of image pixels of the image data.

12. Apparatus as set forth in claim 8 and further comprising means for generating a displayable image of the image data, the displayable image having a plurality of pixels individual ones of which correspond to one of the N×M arrays.

13. Apparatus as set forth in claim 8 and further comprising means for generating a displayable image of the image data, the displayable image having a plurality of pixels individual ones of which have a visual characteristic that is a function of a number of foreground pixels of at least one of the N× arrays.

14. Apparatus as set forth in claim 8 and further comprising means for generating a displayable image of the image data, the displayable image having a plurality of pixels individual ones of which have a visual characteristic that is a function of the numbers of foreground pixels of one of the N×M arrays and of neighboring ones of the N×M arrays.

15. A method for processing digitized image data representative of a page, comprising the steps of:

setting a boundary specification of a bounding box to an initial condition so as to enclose the digitized image data;

partitioning the digitized image data into rows and columns of N×M arrays of image pixels while repetitively processing M pixels along N scanlines to detect occurrences, if any, of an image pixel having a foreground value;

for a detected occurrence of an image foreground pixel, indicating that the N×M array, within which the foreground pixel is located, is occupied by at least one foreground pixel;

for an indicated foreground-occupied N×M array of image pixels, incrementing a corresponding N×M array row count and a corresponding N×M array column count, and adjusting the boundary specification of the bounding box so as to enclose within the bounding box the indicated foreground-occupied N×M array of image pixels;

after processing a last scanline, examining the boundary specification of the bounding box; and, if the boundary specification is set at the initial condition, declaring the page to be blank.

16. A method as set forth in claim 15, and including an additional step of generating a displayable image of the image data, the displayable image having a plurality of pixels individual ones of which represent a plurality of image pixels of the image data.

17. A method as set forth in claim 15, wherein the step of setting a boundary specification sets a top edge of the bounding box to be below a last scanline, sets a bottom edge of the bounding box to be above a first scanline, sets a left edge of the bounding box to be right of the scanlines, and sets a right edge of the bounding box to left of the scanlines.

* * * * *